United States Patent [19]  [11]  4,434,252
Dorrestijn et al.  [45]  Feb. 28, 1984

[54] RIGID POLYVINYL CHLORIDE FOAM

[75] Inventors: Antoon Dorrestijn, Grevenbicht; Pieter J. Lemstra, Brunssum; Lambert H. T. Van Unen, Heerlen, all of Netherlands

[73] Assignee: Stamicarbon B.V., Geleen, Netherlands

[21] Appl. No.: 449,647

[22] Filed: Dec. 14, 1982

Related U.S. Application Data

[63] Continuation of Ser. No. 256,668, Apr. 22, 1981, abandoned.

[30] Foreign Application Priority Data

Apr. 26, 1980 [NL] Netherlands .......................... 8002463
Apr. 26, 1980 [NL] Netherlands .......................... 8002464

[51] Int. Cl.$^3$ .............................................. C08J 9/14
[52] U.S. Cl. ..................................... 521/134; 264/53; 521/75; 521/79; 521/81; 521/145; 521/98

[58] Field of Search ................... 521/134, 79, 81, 98, 521/75; 264/53

[56] References Cited

U.S. PATENT DOCUMENTS 3,879,313 4/1975 Huntzinger et al. ................. 521/134
3,975,315 8/1976 Parks .................................... 521/140
4,025,465 5/1977 Dorrn et al. ......................... 521/134

*Primary Examiner*—Morton Foelak

[57] ABSTRACT

New rigid polyvinyl chloride foam having a density of less than 200 kg/m$^3$ and having a uniform, fine-celled cell-structure consisting of a rigid vinyl chloride homopolymer containing per 100 parts by weight of polyvinyl chloride 0.1–15 parts by weight of a homo- or copolymer of an alkyl methacrylate having an alkylgroup of 1–10 carbon atoms having a viscosity of the solution $\eta_{0.1}$ of between $1\times10^{-6}$ and $4\times10^{-6}$ m$^2$/s measured at 293 K in 1,2 dichloro ethylene and a method for the preparation of such a new rigid polyvinyl chloride foam.

10 Claims, No Drawings

RIGID POLYVINYL CHLORIDE FOAM

This is a continuation of application Ser. No. 256,668 filed Apr. 22, 1981 now abandoned.

The invention relates to a new rigid polyvinyl chloride foam having a density of less than 200 kg/m$^3$ and having a uniform, fine-celled cell-structure with closed cells of which at least 95% have a cell-diameter of at most 300 μm which consists of a rigid vinyl chloride homopolymer containing per 100 parts by weight of polyvinyl chloride 0.1–15, preferably 1–10, specifically 3–8, parts by weight of a homo- or copolymer of an alkylmethacrylate having an alkyl group of 1–10 carbon atoms having a viscosity of the solution $\eta_{0.1}$ between $1 \times 10^{-6}$ and $4 \times 10^{-6}$, by preference of between $1.5 \times 10^{-6}$ and $3.5 \times 10^{-6}$, m$^2$/s measured at 293 K in 1,2 dichloro ethylene. The density of this foam is by preference 10–100 kg/m$^3$, specifically 10–50 kg/m$^3$.

Said rigid vinyl chloride, homopolymer has a K-value according to Fikentscher of by preference 45–80, more in particular 50–70, and may have been prepared in any way known in itself, e.g. by suspension, emulsion or mass polymerization. It contains no or virtually no plasticizers.

A rigid polyvinyl chloride foam with a density of less than 200 kg/m$^3$ that consists of rigid vinyl chloride homopolymer that contains a homo- or copolymer of an alkylmethacrylate having an alkylgroup of 1–10 carbon atoms and a rather low reduced viscosity is known from the Belgian patent No. 879945. However, this accords to a pretty coarse-celled foam that at densities lower than 200 kg/m$^3$ shows shrinkage after formation. In this patent specification further foams based on copolymers of vinyl chloride and vinyl acetate are discussed. However, these foams show major disadvantages in respect of foams based on vinyl chloride homopolymer. Thus they have a much lower glass transition temperature and very inferior burning characteristics than foams based on vinyl chloride homopolymer.

Polyvinyl chloride foams having a density of less than 200 kg/m$^3$ are also known form the Dutch patent application No. 6611678.

The preparation thereof is based on polyvinyl chloride with at most 5% of plasticizer, a plasticizer being defined as a compound of very low volatility, usually boiling above 200° C. at 50 mm mercury, such as dioctyl phthalate, dibutyl phthalate, dioctyl adipate, dioctyl sebacate and tricresyl phosphate, and preferably with other additives such as stabilizers, pigments, lubricants and chemical blowing agents or other nucleating agents mixed with a physical blowing agent such as acetone, methyl formiate, ethyl formiate, methyl acetate, monochloromethane and dichloromethane.

If such a mixture is extruded to foam, this does not proceed satisfactorily in a number of aspects. The surface structure of the foams obtained leaves much to be desired and the foam is coarse-celled and to a large extent open-celled. The density of the foamed material cannot easily be controlled and is often higher than desired. The dimensional stability at elevated temperature, too, usually appears to be too slight, so that when the foam, after extrusion, is passed through a calibration device it cannot be processed into an extrudate having constant or desired dimensions. Polyvinylchloride foam according to the invention shows both a uniform, fine-celled cell-structure with closed cells of which at least 95% has a cell-diameter of at most 300 μm, and a good dimensional stability at elevated temperature, and an attractive appearance, and a density of less than 200 kg/m$^3$.

Polyvinyl chloride foam according to the invention shows both a uniform, fine-celled cell-structure with closed cells of which at least 95% have a cell-diameter of at most 300 μm, and a good dimensional stability at elevated temperature, and an attractive appearance, and a density of less than 200 kg/m$^3$.

According to the invention these homo- or copolymers of an alkyl methacrylate preferably are homo- or copolymers of methyl methacrylate. The copolymers may contain up to 25 mol. % of an alkyl acrylate with 1–10 carbon atoms in the alkyl group as comonomer. Such copolymers of methacrylate by preference contain alkyl acrylates with 1–4 carbon atoms in the alkyl chain, such as methyl acrylate, ethyl acrylate, n-butyl acrylate, as comonomer.

Beside with alkyl acrylates, the alkyl methacrylates may also be copolymerized with minor quantities, e.g. up to 20% by weight, of one or more other comonomers, for instance with styrene, alkyl styrenes such as α-methyl styrene, acrylonitrile or acrylamide. By preference use is made of polymethyl methacrylate or copolymers of methyl methacrylate with an acryl acrylate having 1–4 carbon atoms in the alkyl chain, or with styrene.

The methyl methacrylate copolymers preferably contain at least 80% by weight of polymerized methyl methacrylate.

Methyl methacrylate polymers and copolymers are known in themselves and commercially available, so that a more detailed description, especially of the preparation, can be dispensed with. For the sake of brevity these polymers will here be referred to as PMMA.

In addition, the rigid vinyl chloride homopolymer according to the invention may contain the additives usual for polyvinyl chloride.

Thus, lubricants or mixtures of lubricants may be incorporated into the rigid vinyl chloride homopolymer in amounts of preferably 0.5–5% by weight, e.g. paraffin, polyethylene wax, calcium stearate, ethylene bisstearyl amide, and other lubricants known in themselves.

Finely divided inorganic fillers and/or pigments may also be incorporated into the rigid vinyl chloride homopolymer according to the invention in amounts of preferably 1–15% by weight. Such fillers or pigments are, for instance, titanium dioxide, iron oxide, calcium carbonate and silicon dioxide.

Usual stabilizers and other additives usual in themselves may be added to the rigid vinyl chloride homopolymer in amounts of preferably 0.5–4% by weight. Suitable stabilizers are, for instance, lead compounds, barium-cadmium compounds and tin compounds usually applied as such.

A very suitable impact strength modifier for the rigid vinyl chloride homopolymer according to the invention is a copolymer into which at least an alkyl methacrylate with an alkyl group having 1–10 carbon atoms, butadiene-1,3 and styrene and/or α-methyl styrene are polymerized. Of this by preference 0.1–15, in particular 1–10, parts by weight per 100 parts by weight of polyvinyl chloride are applied.

Copolymers containing at least an alkyl methacrylate with an alkyl group having 1–10 carbon atoms, butadiene-1,3 and styrene and/or α-methyl styrene are known. By preference, these are graft polymers in which the alkyl methacrylate, in particular methyl methacrylate, may be grafted on to a butadiene-styrene polymer, but also, with alkyl methacrylate and styrene and/or α-methyl styrene, on to a butadiene polymer. The butadiene polymer used for grafting may in the latter case be both a homo- and a copolymer of butadiene-1,3 with at least 50 mol. % of butadiene and alkenically unsaturated monomers copolymerizable with it, such as acrylonitrile, alkyl acrylate, alkyl methacrylate, isoprene or chloroprene. Aromatic vinyl compounds, in particular styrene or α-methyl styrene, have already been mentioned. The graft polymers may contain up to 80% by weight of butadiene polymer. Although graft polymers containing slight amounts, for instance 5 to 10% by weight, of butadiene polymer are possible, the polymers for the above purpose are to contain at least 20% by weight of butadiene polymer. Graft polymerizing not only includes graft polymerization but also homo- or copolymerization of the monomers, so that a polymer mixture is obtained which however, for the sake of simplicity, is referred to as graft polymer. For the sake of brevity the polymers meant here will further be referred to as MBS.

In the graft polymers used by preference, in which an alkyl methacrylate, preferably methyl methacrylate and styrene and/or α-methyl styrene are grafted on to a butadiene polymer, a part of the alkyl methacrylate may be substituted by acrylonitrile. However, the amount of alkyl methacrylate must at least be equal to the amount of acrylonitrile, and preferably it is twice as large. For the sake of simplicity these are in the context of this description also deemed to be covered by the therm MBS.

Mention is made of the fact that from Dutch patent application 7409435 a process is known for the preparation of foamable polymer compositions on the basis of vinyl chloride homo- and/or copolymers containing little or no plasticizer, characterized in that per 100 parts by weight of the vinyl chloride polymer:

(a) 1-15 parts by weight of a homo- or copolymer of an alkyl methacrylate having an alkyl group with 1-10 carbon atoms, and (b) 1-15 parts by weight of a copolymer into which at least an alkyl methacrylate having an alkyl group with 1-10 carbon atoms, butadiene-1,3 and styrene, and/or α-methyl styrene are polymerized, the amounts of components (a) and (b) being in total at most 15 parts by weight, as well as only a chemical foaming agent are incorporated. According to said patent application, however, only foams having a density of at least 400 kg/m³ can be prepared from this. Attempts to use this material to make foams of a reasonable quality having a density lower than 400 kg/m³ fail according to this Dutch patent application.

The invention also covers a process for the preparation of the above-mentioned rigid polyvinyl chloride foam. The rigid vinyl chloride homopolymer provided with 0.1-15, preferably 1-10, specifically 3-8, parts by weight per 100 parts by weight of polyvinyl chloride of a homo- or copolymer of an alkyl methacrylate having an alkyl group with 1-10 carbon atoms having a viscosity of the solution $\eta_{0.1}$ of between $1 \times 10^{-6}$ and $4 \times 10^{-6}$, by preference of between $1.5 \times 10^{-6}$ and $3.5 \times 10^{-6}$, m²/s measured at 293 K in 1,2 dichloro ethylene is foamed with the aid of 5-50 parts by weight, in particular 10-30 parts by weight, per 100 parts by weight of polyvinyl chloride of a physical blowing agent, preferably while applying by preference 0.5-2 parts by weight of nucleating agent per 100 parts by weight of polyvinyl chloride.

Very suitable physical blowing agents are volatile organic substances having a boiling point at atmospheric pressure below 400 K. By preference, according to the invention one or more fluoro chloro alkanes, more particularly trichloro fluoro methane and/or dichloro difluoro methane, are used as physical blowing agent.

Very suitable nucleating agents are very finely divided powders of one or more compounds, which under the circumstances during the foaming give off gaseous products, for example of sodium hydrogen carbonate, calcium carbonate and in particular citric acid.

This foaming according to the above process can suitably be carried out by means of an extruder.

Thus, very fine-celled, homogeneous foams with closed cells of which at least 95% have a cell-diameter of at most 300 μm and a density of less than 200 kg/m³ are obtained which are stronger, have better toughness, much better burning characteristics, better smoke behaviour, and much better resistance to weather influences, especially to the influence of moisture and to the influence of light, than the more expensive, light polystyrene foams.

The density of the rigid polyvinyl chloride foams according to the invention can be controlled for instance by adjusting the blowing agent content of the rigid vinyl chloride homopolymer to be foamed or by adjusting the conditions under which foaming takes place, for instance the extrusion conditions such as melt temperature, melt pressure and/or extrusion speed.

According to a very suitable embodiment for the preparation of the rigid polyvinyl chloride foam, a granulate of the rigid vinyl chloride homopolymer, into which the homo- or copolymer of an alkyl methacrylate and, optionally, the usual additives are incorporated, is impregnated with a physical blowing agent and by preference an amount of nucleating agent is added. The impregnated granulate, preferably mixed with nucleating agent, is fed to an extruder, via which extruder it is foamed.

According to another suitable process for the preparation of foam according to the invention a mould is filled with granulate that, as described above, is impregnated with a physical blowing agent. Subsequently, this mould is heated to a temperature, preferably to 350-550 K, at which the granulate foams. The foamed granulate fills the mould, the foamed granulate grains ahere to each other and a foamed product having the shape of the mould is formed.

According to yet another suitable process for the preparation of foam according to the invention al ingredients of the foam to be formed, preferably together with a nucleating agent, are fed to the front part of an extruder. Only further down the extruder is the physical blowing agent introduced - under pressure - into the mixture, which by then has already passed through part of the extruder. After introduction of the physical blowing agent, further mixing and cooling follow in the rest of the extruder.

The invention will be elucidated with reference to the following non-restrictive examples and the comparative experiment.

EXAMPLE 1

In a high-speed mixer 100 parts by weight of rigid vinyl chloride homopolymer having a K-value of 59, are mixed with 6 parts by weight of a PMMA with a glass transition temperature of 378 K and a viscosity of the solution $\eta_{0.1} = 2.59 \times 10^{-6}$ m$^2$/s, measured at 293 K in 1,2 dichloro ethylene, 1.5 parts by weight of a lead stabilizer, 1.5 parts by weight of a lead salt of a fatty acid and 0.6 parts by weight of polyethylene wax.

Subsequently, this mixture is fed to a double-screw extruder by which it is granulated.

The granulate is stirred for 22 hours, with an excess of trichloro fluoro methane at 1.6 MPa and 360 K, in an autoclave.

Subsequently, the autoclave is cooled, the pressure relieved and the granulate, now impregnated with trichloro fluoro methane, separated off from the remaining trichloro fluoro methane. The granulate appears to be impregnated with 22 parts by weight of trichloro fluoro methane per 100 parts by weight of polyvinyl chloride.

This impregnated granulate is mixed with one part by weight of powdered citric acid per 100 parts by weight of polyvinyl chloride. The mixture thus obtained is fed to a single-screw extruder. In this single-screw extruder the material is pressurized and passes a temperature profile extending via a maximum of approximately 415 K, a temperature at which the material behaves like a high-viscosity melt, to approximately 365 K at the extruder outlet.

The material leaves the extruder via a capillary, after which it foams.

Using a single-screw extruder, with a screw speed of 1.5 s$^{-1}$ and with:

| | | |
|---|---|---|
| internal diameter of cylinder | = | 20 mm |
| L/D | = | 26 |
| Feed zone | = | 7 D, screw depth 4.4 mm |
| Compression zone | = | 8 D |
| Pump zone | = | 11 D, screw depth 1.6 mm |
| Capillary diameter | = | 2 mm |
| Capillary length | = | 8 mm | and at a throughput of 1.5 g/s, a foam is obtained having a density of 28 kg/m$^3$ and a uniform, fine-celled cell-structure with closed cells of which 96% have a cell-diameter of at most 300 μm and an attractive appearance.

EXAMPLE 2

In a high-speed mixer 100 parts by weight of vinyl chloride homopolymer, having a K-value of 59, are mixed with 6 parts by weight of the same PMMA, 1.5 parts by weight of the same lead stabilizer, 1.5 parts by weight of the same lead salt of a fatty acid, 0.6 parts by weight of the same polyethylene wax as in Example 1, and with 5 parts by weight of finely divided calcium carbonate and 3 parts by weight of an MBS consisting of a graft polymer of methyl methacrylate and styrene on polybutadiene containing 40% by weight of butadiene units, 17% by weight of methyl methacrylate units and 41% by weight of styrene units as well as 2% by weight of acrylonitrile units.

Subsequently, this mixture is fed to a double-screw extruder, by which it is granulated.

The granulated is stirred for 22 hours, with an excess of trichloro fluoro methane at 1.6 MPa and 360 K, in an autoclave.

Subsequently, the autoclave is cooled, the pressure relieved and the granulate, now impregnated with trichloro fluoro methane, separated off from the remaining trichloro fluoro methane. The granulate is found to be impregnated with 25 parts by weight of trichloro fluoro methane per 100 parts by weight of polyvinyl chloride.

This impregnated granulate is fed to the same single-screw extruder as in Example 1, in which it is subjected to the same treatment.

The material leaves the extruder via a capillary, after which it foams. A foam is obtained having a uniform, fine-celled cell-structure of closed cells and an attractive appearance. Thus, at a throughput of 1.0 g/s (screw speed 1.0 s$^{-1}$) a foam having a density of 80 kg/m$^3$ (97% of the cells have a cell-diameter of at most 300 μm), is obtained, at a throughput of 1.5 g/s (screw speed 1.5 s$^{-1}$) a foam having a density of 28 kg/m$^3$ (96% of the cells have a cell-diameter of at most 300 μm), and at a throughput of 2.0 g/s (screw speed 2.0 s$^{-1}$) a foam having a density of 10 kg/m$^3$ (96% of the cells have a cell-diameter of at most 300 μm).

Comparative experiment

In a high-speed mixer, 100 parts by weight of vinyl chloride homopolymer, having a K-value of 59, are mixed with 1.5 parts by weight of the same lead stabilizer, 1.5 parts by weight of the same lead salt of a fatty acid and 0.6 parts by weight of the same polyethylene wax as in Example 1. Consequently, no PMMA is added.

From this mixture it is attempted to prepare a foam in the same way as described in Example 1. However, it is found to be impossible to make a somewhat resonable foam from such a mixture (without PMMA). The product of the single-screw extruder appears to be virtually unfoamed and to rate an irregular structure.

The invention also includes objects prepared entirely or partly from rigid polyvinyl chloride foam according to the invention.

We claim:

1. New rigid polyvinyl chloride foam having a density of less than 200 kg/m$^3$ and having a uniform, fine-celled cell-structure with closed cells of which at least 95% have a cell diameter of at most 300 μm, consisting of a rigid vinyl chloride homopolymer containing per 100 parts by weight of polyvinyl chloride 0.1–15 parts by weight of a homo- or copolymer of an alkyl methacrylate having an alkylgroup of 1–10 carbon atoms having a viscosity of the solution $\eta_{0.1}$ of between $1 \times 10^{-6}$ and $4 \times 10^{-6}$ m$^2$/s measured at 293 K in 1,2 dichloro ethylene and foamed by use of a physical blowing agent.

2. Rigid polyvinyl chloride foam according to claim 1, characterized in that said alkyl methacrylate is a methyl methacrylate.

3. Method for the preparation of a rigid polyvinyl chloride foam having a density of less than 200 kg/m$^3$ and having a uniform, fine-celled cell-structure with closed cells of which at least 95% have a cell-diameter of at most 300 μm, characterized in that a rigid vinyl chloride homopolymer provided with 0.1–15 parts by weight per 100 parts by weight of polyvinyl chloride of a homo- or copolymer of an alkyl methacrylate having an alkyl group of 1–10 carbon atoms having a viscosity of the solution $\eta_{0.1}$ of between $1\times 10^{-6}$ and $4\times 10^{-6}$ m$^2$/s measured at 293 K in 1,2 dichloro ethylene is foamed with 5–50 parts by weight of a physical blowing agent per 100 parts by weight of polyvinyl chloride.

4. Method according to claim 3, characterized in that methyl methacrylate is used as said alkyl methacrylate.

5. Process according to claim 3, characterized in that as physical blowing agent one or more fluoro chloro alkanes, by preference trichloro fluoro methane and/or dichloro difluoro methane, are used.

6. Method according to claim 3, characterized in that prior to the foaming a nucleating agent, preferably a very finely dispersed powder of one or more compounds, which under the circumstances during the foaming give off gaseous products, is added to the rigid polyvinyl chloride, by preference in an amount of 0.5–2 parts by weight of nucleating agent per 100 parts by weight of polyvinyl chloride.

7. Method according to claim 3, characterized in that the rigid vinyl chloride homopolymer with said homo- or copolymer of an alkyl methacrylate is first granulated via an extruder, subsequently this granulate is impregnated with the physical blowing agent and then foamed.

8. Method according to claim 3, characterized in that the rigid vinyl chloride homopolymer is foamed via an extruder.

9. Method according to claim 7, characterized in that the impregnated granulate is placed in a mould and subsequently the granulate is foamed by heating the mould to 350–550 K.

10. Method according to claim 3, characterized in that all ingredients of the rigid polyvinyl chloride foam are introduced into the front part of an extruder and the physical blowing agent is introduced under pressure further down the extruder.

* * * * *